United States Patent [19]

Irani

[11] Patent Number: 4,828,029

[45] Date of Patent: May 9, 1989

[54] SOLUBILIZING SURFACTANTS IN MISCIBLE DRIVE SOLVENTS

[76] Inventor: Cyrus A. Irani, 7718 Stonesdale, Houston, Tex. 77095

[21] Appl. No.: 132,148

[22] Filed: Dec. 14, 1987

[51] Int. Cl.$^4$ .............................................. E21B 43/22
[52] U.S. Cl. .................................... 166/268; 166/274; 252/8.554
[58] Field of Search ............... 166/266, 268, 273, 274, 166/305.1; 252/8.554

[56] References Cited

U.S. PATENT DOCUMENTS

| | | | |
|---|---|---|---|
| 2,866,507 | 12/1958 | Bond et al. | |
| 3,082,822 | 3/1963 | Holm et al. | 166/274 |
| 3,126,952 | 3/1964 | Jones | 166/274 |
| 3,196,944 | 7/1965 | Bernard et al. | 166/273 |
| 3,212,575 | 10/1965 | Fisher et al. | 166/274 |
| 3,354,953 | 11/1967 | Morse | |
| 3,356,138 | 12/1967 | Davis, Jr. et al. | 166/274 |
| 3,435,898 | 4/1969 | Thompson | 166/274 |
| 3,570,601 | 11/1969 | Dauben et al. | |
| 3,616,858 | 11/1971 | Raza | 166/274 X |
| 4,609,043 | 9/1986 | Cullick | |
| 4,629,000 | 12/1986 | Hurd | 166/274 |

OTHER PUBLICATIONS

"CO$_2$ as Solvent for Oil Recovery", F. M. Orr, Jr. et al., (Chemtech, Aug. 1983 at 42, et seq).
"Development of Mobility Control Methods to Improve Oil Recovery by CO$_2$: Final Report", J. P. Heller and J. J. Taber, DOE/MC/10689-17, Feb. 1984.
"Mobility Control for CO$_2$ Floods—A Literature Survey", J. P. Heller, DOE/MC/10689-3, Oct. 1980.
"Foams in Porous Media-Supri TR-49", S. S. Marsden, DOE/SF/11564-15, Jul. 1986.
"The Mechanism of Gas and Liquid Flow Through Porous Media in the Presence of Foam", L. W. Holm, SPEJ, Aug. 1968, at 359–369.
"Slim-Tube Investigation of CO$_2$ Foams", C. A. Irani and C. Solomon, Jr., Presented at the SPE/DOE Fifth Symposium on Enhanced Oil Recovery of the SPE, Tulsa, OK, Apr. 20-23, 1986, SPE/DOE 14962.

Primary Examiner—George A. Suchfield

[57] ABSTRACT

A process for dissolving surfactants in miscible gaseous drive fluids is discussed. The poor solvent properties of these drive fluids are enhanced by the addition of a cosolvent which facilitates solubilization of the surfactant into the drive solvents. Solubilization of surfactants in the HLB range of 0 to 10 can be facilitated by the addition of less polar cosolvents. Surfactants of HLB range 10 to 20 will show improved solubility with more polar cosolvents. Surfactants with low solubility parameter values and low polarity will require minimal cosolvent addition. A miscible drive phase enriched with surfactant will show improved mobility in a subsurface, oil-bearing, formation due to the foaming action generated with in-place aqueous fluids.

19 Claims, No Drawings

SOLUBILIZING SURFACTANTS IN MISCIBLE DRIVE SOLVENTS

FIELD OF THE INVENTION

This invention relates to the solubilization of surfactants in miscible drive solvents, particularly carbon dioxide, for the purpose of enhancing the oil recovery characteristics of the resulting miscible drive phase when injected into subterranean formations.

BACKGROUND OF THE INVENTION

Only a portion of the oil originally present in a subterranean oil-bearing formation is recovered during the primary production cycle. During primary production only the natural pressure present in the formation is exploited for oil recovery. Waterflooding is the most commonly used secondary recovery process. Injection of water into strategically located wells serves to revive formation pressure and to physically displace oil present in the subterranean formation. However, large volumes of the original in-place hydrocarbons, in some instances as high as 50%, still remain trapped in the reservoir even after waterflooding.

Numerous approaches have been taken to try and recover the residual oil after waterflooding has ceased to be economical. These have included thermal methods, such as steam stimulation, fire flooding and in situ combustion. Recovery processes have also utilized components such as nitrogen, carbon dioxide and light hydrocarbon gases to displace residual oil. For formations containing lighter oil deposits, for example, oil-bearing strata where the API gravity of the oil phase is 10 or greater, the dominant method for enhanced oil recovery has been carbon dioxide injection. In some limited instances where the oil producing strata are at substantially greater depths, nitrogen has been used because greater injection pressures are required. In some locations, particularly parts of Alaska and Canada, light hydrocarbon gases which are generated during the oil recovery step are subsequently reinjected for pressure maintenance and for the recovery of additional oil.

In a miscible flooding operation, the injected solvent is capable of forming a single phase solution with the oil in place, which assists in the oil recovery step. Barring any areal sweep inefficiencies, a miscible drive process can effectively displace oil from the parts of the reservoir through which the solvent flows because a single phase is flowing through the formation. In multiple phase flow, interfaces and the retentive forces of capillarity and interfacial tension have to be overcome before the oil can be displaced.

Carbon dioxide is the most commonly used solvent in light gas displacement processes. Under certain appropriate conditions of oil gravity and reservoir temperature and pressure, carbon dioxide is first contact miscible with reservoir hydrocarbons. However, if the reservoir temperature is too high, or the reservoir pressure is not high enough, carbon dioxide may not be first contact miscible with the in-place hydrocarbons. In such instances, multiple contact miscibility between the injected carbon dioxide and the in-place hydrocarbons is still possible. During multiple contact miscibility, the neat carbon dioxide initially injected continues to strip light hydrocarbons from successive contacts with the in-place hydrocarbons, until it achieves a composition suitable for miscibility with the in-place fluids.

When carbon dioxide first contacts reservoir hydrocarbons, it dissolves in the oil phase, thus swelling the hydrocarbon fluids and reducing their viscosity. Both of these effects have a very positive influence on final oil production. By swelling the oil, an expansion of the oil phase into existing flowing channels facilitates additional oil recovery. By lowering oil viscosity, the energy required to move the oil through the pore structures in the reservoir is minimized, and again more oil is accessed by the displacing solvent. These two positive effects attend the injection of carbon dioxide irrespective of the displacement process that results.

Both nitrogen and light hydrocarbons will show similar positive effects when injected into oil bearing formation. Nitrogen, however, is less soluble in the oil phase. Therefore, oil swelling and viscosity reduction of the in-place hydrocarbons is not as pronounced. Additionally, much higher pressures (relative to carbon dioxide) are required for nitrogen to achieve first or multiple contact miscibility with crude oils.

Light hydrocarbons are excellent displacing solvents for oil because they are readily soluble causing high swelling and viscosity reduction, and readily achieve first or multiple contact miscibility with the in-place oil phase. However, the expense of procuring these light hydrocarbons and the inefficiency in leaving large volumes of these hydrocarbons behind in the reservoir during the displacement process precludes the extensive use of such systems, except in remote locations where no market for the hydrocarbons is available.

Unfortunately, the efficacy of all these displacement processes is severely hampered by the low viscosity of the solvent phase at reservoir conditions. Thus, at typical reservoir conditions, e.g., 95° F. and 3500 psia, the light gas displacement solvent can be expected to have a viscosity of less than 0.1 centipoise (cp), whereas most reservoir fluids range in value from 0.4 cp to 8 cp. Under these conditions, a very adverse mobility ratio between displaced and displacing fluids is created, resulting in fingering of the displacing fluid through the in-place reservoir fluids and early breakthrough of the injected solvent. This viscosity disparity tends to become even more pronounced at higher temperatures.

Because of the advantages that these light gas displacement processes offer, substantial effort has been expended to address the issue of low viscosity and early solvent breakthrough. One approach is to thicken the displacing solvent by dissolving a polymer phase in it for viscosity enhancement. However, the solvent property of nitrogen at reservoir conditions is too low to adequately dissolve anything other than low molecular weight components. Viscosity enhancement due to the dissolution of even large amounts of these low molecular weight components would be too insignificant to represent a meaningful improvement over the initial solvent viscosity.

Dissolution of polymers into light hydrocarbons is easier, and some results are available on the solubility of some polymer types in fluids like ethane, ethylene, propane, propylene, butane, and butylene. For example, U.S. Pat. No. 3,354,953 issued to Morris teaches the use of crude oil miscible solvents such as propane to displace crude oil through a formation. Morse further suggests that the viscosity of the propane can be controlled by the addition of kerosene. In U.S. Pat. No. 3,570,601 issued to Dauben et al teaches the recovery of oil using viscous propane, where the propane viscosity is increased by the dissolution of a solid polymer such as polyisobutylene in a heavier hydrocarbon such as heptane, and then diluting this solution with the propane to form the oil driving bank.

An article entitled "$CO_2$ as Solvent for Oil Recovery" by F. M. Orr, Jr. et al (Chemtech, August 1983, page 42, et seq.), discusses attempts to dissolve polymers into carbon dioxide. It was reported that low-molecular weight polymers dissolved in carbon dioxide resulted in only a 10% to 20% increase in solution viscosity.

A later study on polymer solubility by J. P. Heller and J. J. Taber has been reported in "Development of Mobility Control Methods to Improve Oil Recovery by $CO_2$: Final Report," DOE/MC/10689-17. This study lists some 53 commercially available polymers which were tried in an effort to thicken the carbon dioxide, but with little success. U.S. Pat. No. 4,609,043 issued to Cullick teaches that the solubility of polymers in carbon dioxide can be enhanced by the addition of an entrainer, preferably a polar organic compound such as an alcohol or a glycol, to the carbon dioxide.

The prior art also discusses numerous indirect approaches that have been attempted for mobility control during miscible gas drives. Two prominent methods are WAG and foams. WAG, which stands for Water Alternating Gas, was developed in the late 1950's as an attempt to control the mobility of LPG (Liquid Petroleum Gas) floods. Theoretically, by alternating the injection of slugs of water and the displacing solvent, the relative permeability of the solvent phase can be lowered, and thus its mobility improved. However, because the WAG process requires an injection of large volumes of water, the solvent is blocked by this water phase from contacting in-place hydrocarbons. Additionally, gravitational effects away from the injection well will cause a segregation of the water phase and the lighter solvent. This gravity override of the solvent results in loss of mobility control.

A report entitled "Mobility Control for $CO_2$ Floods—A Literature Survey" by J. P. Heller (DOE/MC/10689-3) outlines the historical basis for the development of the WAG process. This same literature survey also covers the development of foams for mobility control during miscible, light gas drives. Another report which offers a historical treatment of the use of foam technology is entitled "Foams in Porous Media'-'—SUPRI TR-49 by S. S. Marsden (DOE/SF/11564-15).

U.S. Pat. No. 2,866,507, "Gas Drive Recovery Process" issued to D. C. Bond and O. C. Holbrook, suggested the injection of an aqueous slug containing water-soluble, foam-producing surfactants, followed by gas injection for the formation of foam. Since then, many studies have been directed at understanding the nature and flow of these foams in reservoirs, and toward successfully implementing these foams in the oil field.

Based on these laboratory studies, two factors of primary importance with regard to the use of foams were established. First, gas phase mobilities could be substantially reduced in laboratory core experiments by either simultaneous or sequential injection of a gas and an aqueous surfactant solution. Second, for some surfactant systems, the presence of an oil phase was detrimental to foam formation, which effect could be mitigated by increasing the surfactant concentration.

In order to form a foam, three ingredients are required. A continuous aqueous phase, a water soluble surfactant to lower the interfacial tension, and a dispersed gas phase, such as air or nitrogen, or pseudo-gas or fluid phase such as supercritical carbon dioxide. Some drive mechanism that will move the dispersed phase through the continuous aqueous phase is also necessary to form the lamella structures which comprise a foam. In the absence of these three ingredients and a driving mechanism, foam will not form.

Thus, the formation and propagation of foams through porous media is dictated largely by the availability of the gas and aqueous surfactant phases. The reason foams have not been more successfully exploited in actual field applications is because the movement and availability of the three required components cannot be controlled with any certainty. For example, in a publication entitled "The Mechanism of Gas and Liquid Flow Through Porous Media in the Presence of Foam," published in SPEJ, 8, 1968, pages 359 to 369, L. W. Holm measured the frontal velocity of tracer concentrations in both gas and liquid phases of a moving foam. In general, different frontal velocities were measured for the liquid and gas components of the foam.

The lower density and much lower viscosity of the gas phase relative to the liquid phase, will result in the gas phase having a much higher mobility relative to the liquid phase. Therefore, the gas phase will always be moving faster than the liquid phase. As a consequence, the injected aqueous phase containing the surfactant will not be available to the gas phase for foam generation and mobility control once the gas breaks through the foam front.

This disadvantage limits the usefulness of foam as a mobility control mechanism, regardless of whether the gas and surfactant are simultaneously injected into the formation or the foam is pre-formed prior to injection. SPE/DOE Paper 14962 entitled "Slim-Tube Investigation of $CO_2$ Foams," which was presented at the Fifth SPE/DOE Symposium on Enhanced Oil Recovery held in Tulsa, Okla., Apr. 20-23, 1986, confirmed this shortcoming and disclosed injecting all the surfactant solution into the formation and then chasing it with carbon dioxide. This approach yielded a foam front that steadily advanced through the formation. While it solved some of the problems associated with mobility control, it did not ensure that the surfactant was adequately contacted by the carbon dioxide during the operation.

SUMMARY OF THE INVENTION

The method of this invention involves the dissolution of surfactants into the miscible gas drive solvent phase of enhanced recovery processes. When the solvent phase is a light hydrocarbon gas, a cosolvent, such as toluene, may or may not be necessary, depending on the surfactant used. If the miscible solvent phase is carbon dioxide or nitrogen, a cosolvent will be required to ensure surfactant solubility.

This invention also provides a novel approach to foam generation in subterranean oil-bearing strata during conventional miscible floods. It represents a substantial improvement over the prior art by providing a better means for controlling the formation and propagation of the foam front. This method differs from conventional approaches because the transportation of the desired surfactant is in the miscible solvent phase rather than the aqueous phase.

By dissolving the surfactant in the solvent phase for foam generation, the surfactant travels as fast as the solvent and is readily available at the solvent front. The foam front will proceed with the solvent front, rather than lag behind it, as has usually been the case. Additionally, by controlling the amount of surfactant injected with the solvent phase, the strength of the foam that forms can be controlled as the operation requires. The need for a separate water phase injection is totally eliminated because the desired water phase will already be present in the formation. Even when gas injection is used for secondary recovery, there is still a high residual water saturation available in the formation. This connate water saturation is adequate for the purpose of this invention.

DETAILED DESCRIPTION OF THE INVENTION

This invention deals with improving the performance of a miscible solvent drive. Miscibility can be achieved by first contact or by multiple contact, both of which concepts are discussed herein. Even though not directly addressed, it will be clear to a person trained in the art, that this same mobility control process can also apply to an immiscible drive.

The miscible drive of this invention primarily utilizes a light gas, or mixtures of gases, as a solvent. A typical example is a carbon dioxide flood, where the carbon dioxide serves as the miscible displacing solvent. The carbon dioxide can be below its critical temperature although at customary reservoir conditions the carbon dioxide will be above its critical temperature. For the purposes of this invention, carbon dioxide is the preferred solvent. Other solvents include nitrogen and mixtures of light hydrocarbons, e.g., less than five carbon atoms.

In most applications, the primary solvent will be one of the three examples described above, but any of the other two may also be present either inadvertently or deliberately. Any such system can be referred to as a miscible drive system or solvent, a light gas drive or solvent, or a miscible light gas drive system.

According to this invention, a surfactant is dissolved into a continuous phase, such as carbon dioxide, nitrogen, or a mixture of light hydrocarbons generally having less than five carbon atoms. These examples represent the conventional solvents in miscible drive processes for enhanced oil recovery, but other solvents may prove equally effective.

For the purpose of this discussion, a surfactant is any component capable of concentrating at the interface separating immiscible phases. Classically, an understanding of surfactants has evolved from a study of oil-water interfaces. In order to concentrate at interfaces, a surfactant must have both hydrophilic and lipophilic functionality. Clearly, the properties of a surfactant will be largely dictated by the magnitude of the relative contributions from the hydrophilic and lipophilic moieties present in the surfactant molecule. A surfactant which is largely hydrophilic can be expected to be more water soluble and give rise to more water continuous and oil dispersed systems. Conversely, a surfactant which is more lipophilic can be expected to be more oil soluble and give rise to oil continuous and water dispersed systems.

The Hydrophile-Lipophile Balance ("HLB") System was developed in order to simplify the process of choosing a specific surfactant for a specific application. By definition, surfactants that have an HLB value between 0 and 10 are considered lipophilic while surfactants with HLB values between 10 and 20 are hydrophilic. However, this scale is a continuum, and consequently, surfactants in the range 8 to 12 can be expected to show intermediate hydrophile-lipophile characteristics.

Specifically, if the surfactant has an HLB value between 12 and 20, the resulting emulsion or dispersion will probably show a marked tendency to be water continuous. Conversely, surfactants with HLB values between 0 and 8 will probably form oil continuous dispersions. Surfactants with HLB values ranging between 8 and 12 could show either type of tendency depending on the nature and relative amounts of the two phases present.

For the purposes of this disclosure, it is understood that the aqueous phase is the water phase present in the reservoir, whether occurring naturally or from prior recovery operations. The lipophilic or non-aqueous phase of this process is the miscible displacement solvent being used, e.g., carbon dioxide, nitrogen or light hydrocarbon.

In conventional foam processes, the surfactants are water soluble, and, therefore, of the hydrophilic type, i.e., HLB values ranging from 10 to 20. The solubility of such a surfactant in any of the miscible drive solvent gas systems will be insignificant from a foam generation standpoint. Consequently, it is necessary that a cosolvent be added to facilitate this solubilization. Because the surfactants are polar, the preferred cosolvent should also be polar. Typical cosolvents are alcohols, including monohydric alcohols, such as methanol, ethanol, propanol, butanol, or glycols, such as ethylene glycol, diethylene glycol, triethylene glycol, or other higher polyglycols. Other potential cosolvents useful in this invention are ketones, glycerides, and halogenated compounds.

Non-polar hydrocarbons are equally applicable as cosolvents. These include all possible hydrocarbons having more than about three carbon atoms, including saturated and unsaturated aliphatics and aromatics. Other potential cosolvents are halogenated compounds and silicone based solvents. Actually, the only limitation on the use of a cosolvent is that the cosolvent be mutually soluble to the extent of at least 1 volume percent in both the solvent phase and the surfactant.

Of course, the cosolvent could also be a combination of cosolvents, for example, combined polar and non-polar systems that will facilitate surfactant solubilization in the miscible drive solvent phase. Thus, in some instances, particularly when the HLB value of the surfactant is high, it might be necessary to add a trace amount of water to compensate for the very strong polar tendency of the surfactant. In such instances, a mixture of methanol and water, for example, might be the best cosolvent combination.

A similar set of considerations also apply to surfactants that are in the HLB range 8 to 12. From a practical standpoint, surfactants that have a siloxane basis may be ideal candidates for this application. This choice is dictated largely by solubility parameter considerations. For example, it is well known that solvent-solute interactions (and hence solute solubility) can be maximized by matching three measurable properties in the solvent and solute, e.g., the solubility parameter, the polarity and the hydrogen bonding tendency of the solvent and the solute. Carbon dioxide, for example, has no polarity or hydrogen bonding tendency, and at reasonable reservoir conditions its solubility parameter will be in the range of 6.9 and less.

Without hydrogen bonding or polarity, the low solubility parameter of carbon dioxide is a real hinderance to the solubilization of surfactants. Therefore, a cosolvent is necessary. Similar arguments can be made for nitrogen and the light hydrocarbons, except that for light hydrocarbons, the solubility parameter values are higher, and consequently surfactants with low solubility parameters might be more readily dissolved. A review of the available data indicates that siloxane based surfactants have the lowest solubility parameter, and thus the maximum likelihood of dissolving in carbon dioxide with minimal cosolvent requirements. Siloxane based surfactants may be sufficiently soluble in lighter hydrocarbons without using cosolvents.

This invention also provides a novel opportunity not available in more conventional approaches to foam generation in reservoir environments. This opportunity is to use surfactants with HLB values of 10 or less. These surfactants are strongly lipophilic and ordinarily not water soluble enough to be used in conventional foam generating schemes. However, the solvent phase in this invention is more lipophilic than hydrophilic. Consequently, these surfactants are ideal candidates for dissolution in the solvent phase. Furthermore, they will require less cosolvents in the solvent phase because of their strong lipophile character.

The same considerations discussed above apply to the choice of cosolvents for the low HLB surfactants. However, the strong lipophilic character of these surfactants suggests that the hydrocarbon cosolvents will be far more effective for these systems. Thus, saturated and unsaturated alkane and aromatic hydrocarbons having two carbon atoms or more are ideal candidates as cosolvents. The preferred cosolvent is toluene. However, components like pentane, hexane, and heptane are also exceptionally good cosolvents. A versatile and economically feasible cosolvent is a kerosine fraction, or a light naphtha cut extracted from the first boiling cuts of crude oils, or even the hydrocarbon fractions that are extracted from crude oil by contacting it with carbon dioxide.

As stated earlier, the nature of the final dispersion is largely dictated by the HLB value of the surfactant. Thus, with the high HLB value surfactants conventionally used with the aqueous phase, the injected miscible gas will be the dispersed phase and will result in foams of conventional texture. However, when surfactants with low HLB values are used according to this invention, the nature of the dispersion might show tendencies to invert. If the surfactant HLB value is between 8 and 10, a foam like dispersion typical of those conventionally observed could still result.

For surfactants with HLB values below 8, there will be a strong tendency for the cosolvent enriched solvent phase to be the continuous phase, trapping the aqueous medium as the discontinuous dispersion. For the purpose of this invention, this result is not a disadvantage. The primary intent is to decrease the mobility of the solvent phase. Whether this is achieved by a system that has water as the continuous phase or as the dispersed phase is not material. The efficiency of the process is greatly improved by having the miscible drive solvent carry the surfactant into the formation regardless of whether the surfactant tends to generate solvent continuous dispersions.

It is expected that the amount of surfactant will vary from about 0.02 to about 10 volume percent of the total drive volume, the cosolvent will range from about 0 to about 40 volume percent, and the gas phase will comprise the remainder of the drive volume. The preferred range of surfactant is from about 0.05 to about 5 volume percent, and the preferred range of cosolvent is from about 0 to about 25 volume percent. Table I illustrates the especially preferred range of volume percentages for surfactant and cosolvent with various gas phase solvents.

TABLE I

|  | Carbon Dioxide | Nitrogen | Hydrocarbon |
| --- | --- | --- | --- |
| Surfactant | 0.2–2.0% | 0.2–2.0% | 0.2–2.0% |
| Cosolvent | 1.0–10.0% | 2.0–20.0% | 0.0–5.0% |
| Gas Solvent | 88.0–98.8% | 78.0–97.8% | 93.0–99.8% |

Another substantial advantage over conventional foaming processes is also possible with this invention. In conventional foam generation operations, surfactant losses due to adsorption on the rock is a major source of expense and lowered efficiency. By containing the surfactant within the solvent phase, as opposed to the aqueous phase, surfactant-rock interactions will be minimized, resulting in substantial savings in surfactant expenditures. These savings could more than compensate for the cost of the cosolvent. Furthermore, most surfactants carried in the aqueous phase encounter a harsh environment in the reservoir, namely complex salinities and hardness in combination with high temperatures and varying rock chemistry. A surfactant carried in the solvent phase can be designed around a much simpler hydrophile because it is subject to limited interactions with the harsh aqueous environment.

For the purpose of this invention, methodologies similar to those conventionally practiced in regular oil recovery operations will be adequate. Thus, after primary production has depleted the reservoir of its natural drive mechanisms, and waterflooding has further depleted the in-place oil to its economically recoverable limit, a surfactant enriched miscible drive process can be initiated. The procedure would be to inject the solvent in a liquid phase at specified locations and at a pressure sufficient to drive the process without fracturing the formation.

Usually the liquid solvent phase is injected at a pressure which will maximize oil recovery during the displacement step, but not fracture the formation. Yet another advantage of this process is that the leading edge of the solvent phase, which has been enriched with cosolvent to facilitate surfactant dissolution, will also reduce the pressure required for generation of miscibility.

The surfactant phase injected with the solvent will interact with the subterranean aqueous phase to generate a foam like dispersion. The mobility of the solvent phase will thus have been improved, resulting in better areal sweep and more oil recovery. The oil will be recovered at producing wells, as in conventional flooding operations.

It is not necessary that all of the miscible solvent phase be enriched with surfactant. It is sufficient that just the leading edge of the solvent phase, where mobility control is most desired, be treated. Once a stable foam front has been achieved by this process, surfactant and cosolvent injection can be slowly tapered off, and the drive mechanism reduced to a pure solvent drive.

Specific remedial action can be undertaken to treat instances of breakthrough of the injected solvent if it is encountered. For example, the injected neat solvent stream can be mixed with the appropriate cosolvent and surfactant for the specific purpose of dissolving the surfactant in the flowing solvent stream and transporting the surfactant to where the solvent breakthrough is occurring.

While it is preferred that the solvent phase be enriched wiht surfactant at the start, it is unlikely that such a process will be used in the field. The unusual approach is to inject neat solvent until it breaks through the foam front, and then take remedial action. A similar approach is also possible in the practice of this invention. Instead of using a foam to stop the break through, surfactant enriched miscible solvent can be injected to achieve the same effect. As stated earlier, the bulk aqueous phase present in the formation or the connate water phase remaining behind after a gas drive will be adequate for in situ foam generation for the purpose of this invention.

Without limiting the scope of the invention, the following hypothetical examples will serve to demonstrate the working of this invention:

EXAMPLE 1

To a 100 cc autoclave is first added, at ambient conditions, a mixture comprising 20 cc of toluene and 1 cc of Span 60 surfactant, making the final mixture 20 volume percent toluene and one volume percent Span 60. Toluene is used as an example of the cosolvents that can be used in this application. Any other saturated or unsaturated, alkane or aromatic hydrocarbon, such as pentane, hexane, benzene or xylene, would be equally effective for this application. Also, an appropriate cosolvent for this purpose is a light naphtha or a kerosine or any other light hydrocarbon fraction extracted from a crude oil mixture.

The Span 60 surfactant is indicative of a surfactant in the HLB range of 0 to 10. More specifically, Span 60 is a stearate type surfactant available from ICI Americas Inc., and has an HLB value of 4.7, which means it has lipophilic characteristics. However, any other surfactant in the HLB range 0 to 10 would be equally applicable for this demonstration. Such surfactants include those having a different chemical basis, including, but not restricted to the mono and diglycerides, sorbitan fatty acid esters, and polyoxyethylene adducts. In certain instances, mixtures of ionic and nonionic surfactants could also fall in this range. A typical ionic surfactant is an alkyl aryl sulfonate, or such similar compounds.

Once the surfactant-cosolvent mixture has been added to the autoclave, the miscible solvent phase, e.g., propane, is added via a pressure enhancing pump, and the system pressure raised to 3500 psi by the propane addition. Propane is indicative of the solvent phase needed for the working of this example. Another common hydrocarbon-type miscible solvent phase is liquid petroleum gas (LPG). Other examples are mixtures of light hydrocarbons, such as methane, ethane, propane, butane, propylene, and butylene. Also, equally applicable in this example is the more conventional miscible solvent carbon dioxide.

At ambient temperatures and 3500 psi, the propane will condense as a fluid phase with liquid-like properties of density and viscosity. At the end of the propane introduction step, there will be three components present in the autoclave: 1 volume percent Span 60 surfactant, 20 volume percent toluene cosolvent, and 79 volume percent propane. The components are thoroughly mixed to generate a homogeneous system comprising the three components in the proportions described above.

This homogeneous phase can be displaced from the autoclave at constant pressure by the injection of mercury into the bottom of the autoclave. This displaced solvent phase is transferred to a core flood apparatus containing a core either saturated with water, or saturated with a two phase mixture of oil and water resulting from waterflooding the core.

During the movement of this surfactant saturated solvent phase through the core, the pressure drop across the core will increase relative to the pressure drop that would be observed if neat solvent were displaced through the core. This increased pressure drop due to the addition of surfactant indicates that the solvent phase is interacting with the aqueous fluids present in the core to form some complex dispersion such as foam or emulsion. Additionally, the breakthrough of the solvent phase is delayed due to this surfactant generated plugging action, and the oil recovery is improved due to the solvent being forced to track through more channels in the core.

EXAMPLE 2

Under conditions described in Example 1, 20 volume percent toluene as cosolvent, and one volume percent of a siloxane derived surfactant such as 200 Fluid (Dow Corning) is added to a 100 cc autoclave. The cosolvent represents only one example of the possible cosolvents. However, in this case a siloxane derived surfactant is preferred because such surfactants usually have better solubility characteristics in miscible solvent phases, such as light hydrocarbon systems or carbon dioxide.

Other examples of commerercially available surfactants include DB-100 and 544 Compound, both from Dow Corning Company. The preferred cosolvent is toluene, but any other saturated or unsaturated alkane or aromatic hydrocarbon, such as pentane, hexane, benzene or xylene is equally effective. Other surfactants include 190 and 193 from the Dow Corning Company. The preferred cosolvent for these surfactants is an alcohol or a glycol or a ketone.

These surfactants will tend to have a low solubility parameter because of the siloxane units. This lower solubility parameter should help to dissolve these surfactants in the miscible drive solvents. Better solubility should also give rise to systems that are homogeneous over broader ranges of temperature and pressure.

As in Example 1, a miscible drive cosolvent such as propane or carbon dioxide can be added to this mixture, and the pressure increased to put the surfactant-cosolvent mixture into solution. The resulting solution can again be used in core flood tests which will demonstrate improved mobility control.

EXAMPLE 3

This example illustrates how surfactants with high HLB values can be dissolved in miscible drive solvents. These surfactants have HLB values ranging from 10 to 20 and are hydrophilic. The starting phase in the autoclave will be 20 volume percent cosolvent, such as alcohol or ethylene glycol, or other such polar nature of the surfactants being used. Using methyl alcohol as the cosolvent, 2 cc of water and 1 cc of the high HLB surfactant is added. The surfactant in this example is Tween 40, which has an HLB value of 15.7 and is available from ICI Americas Inc. A number of other surfactants would also be equally applicable for the purpose of this invention, including polyoxyethylene sorbitan fatty acid esters, especially of the lauryl, palmitate, stearate, and oleate type, the polyoxyethylene sorbitol esters of the oleate and lanolin type, polyoxyethylene acids of the stearate type, and polyoxyethylene alcohols of the lauryl, cetyl, stearyl, oleyl, and tridactyl type.

The use of water as a secondary or supplemental cosolvent is usually preferred because of the highly polar character of these high HLB surfactants, especially when the surfactant is ionic. Typical examples of such surfactants are derivatives of alkyl aryl sulfates and sulfonates. The water is significant with the ionic surfactants because they tend to be strongly polar and have strong ionic groups in the hydrophilic part.

Carbon dioxide will be used as the miscible displacement solvent. However, any other miscible displacement solvent of the type discussed earlier, including propane, LPG or mixtures of light hydrocarbons will be equally applicable. The autoclave will be filled with carbon dioxide at 90° F. and 3500 psi, and the contents of the autoclave will be stirred to achieve a homogeneous phase. Thereafter, a homogeneous phase should be present with the composition 20 volume percent methyl alcohol, 2 volume percent water, 1 volume percent Tween 40 and 77 volume percent carbon dioxide. This mixture will be available for further testing and oil displacement processes as discussed in Example 1.

The foregoing disclosure and description of the invention are illustrative and explanatory thereof, and various changes in the size, shape and materials, as well as in the details of the illustrated construction may be made without departing from the spirit of the invention.

I claim:

1. An improved method for recovering oil from a subterranean, hydrocarbon-bearing formation which is penetrated by at least one injection well and at least one production well wherein a liquid non-aqueous displacement fluid is injected into said formation through said injection well and fluids are produced from said production well, the improvement comprising dissolving in said non-aqueous displacement fluid an effective amount of a surfactant and a cosolvent prior to injecting said fluid into said formation, said cosolvent being adapted to increase the solubility of said surfactant in said displacement fluid, and wherein said displacement fluid is selected from the group comprising carbon dioxide, nitrogen, and mixtures of any combination selected from the group comprising carbon dioxide, nitrogen, and light hydrocarbons.

2. The method of claim 1, wherein said displacement fluid is composed of more than about 50 volume percent carbon dioxide, less than about 10 volume percent surfactant, and less than about 40 volume percent cosolvent.

3. The method of claim 2, wherein said displacement fluid is composed of from about 0.2 to about 2.0 volume percent surfactant, from about 1.0 to about 10 volume percent cosolvent and from about 88.0 to about 98.8 volume percent carbon dioxide.

4. The method of claim 1, wherein said displacement fluid is composed of more than about 50 volume percent nitrogen, less than about 10 volume percent surfactant and less than about 40 volume percent cosolvent.

5. The method of claim 4, wherein said displacement fluid is composed of from about 0.2 to about 2.0 volume percent surfactant, from about 2.0 to about 20 volume percent cosolvent and from about 78.0 to about 97.8 volume percent nitrogen.

6. The method of claim 1, wherein said displacement fluid is carbon dioxide.

7. The method of claim 1, wherein said displacement fluid is nitrogen.

8. The method of claim 1, wherein said displacement fluid is a mixture of carbon dioxide and light hydrocarbons.

9. The method of claim 1, wherein said displacement fluid is a mixture of nitrogen and light hydrocarbons.

10. The method of claim 1, wherein said displacement fluid is a mixture of carbon dioxide and nitrogen.

11. The method of claim 1, wherein said displacement fluid is a mixture of nitrogen, carbon dioxide and light hydrocarbons.

12. An improved method for recovering oil from a subterranean, hydrocarbon-bearing formation which is penetrated by at least one injection well and at least one production well wherein a liquid non-aqueous displacement fluid is injected into said formation through said injection well and fluids are produced from said production well, the improvement comprising dissolving in said non-aqueous displacement fluid an effective amount of a surfactant and cosolvent prior to injecting said displacement fluid into said formation, forming a foam in situ by injecting said displacement fluid into said formation at a rate less than the rate needed to fracture said formation and producing fluids from said production well.

13. The method of claim 12, wherein said displacement fluid is selected from the group comprising carbon dioxide, nitrogen, light hydrocarbon and mixtures thereof.

14. The method of claim 13, wherein said displacement fluid is composed of more than about 50 volume percent carbon dioxide, less than about 10 volume percent surfactant, and less than about 40 volume percent cosolvent.

15. The method of claim 14, wherein said displacement fluid is composed of from about 0.2 to about 2.0 volume percent surfactant, from about 1.0 to about 10 volume percent cosolvent and from about 88.0 to about 98.8 volume percent carbon dioxide.

16. The method of claim 13, wherein said displacement fluid is composed of more than about 50 volume percent nitrogen, less than about 10 volume percent surfactant and less than about 40 volume percent cosolvent.

17. The method of claim 16, wherein said displacement fluid is composed of from about 0.2 to about 2.0 volume percent surfactant, from about 2.0 to about 20 volume percent cosolvent and from about 78.0 to about 97.8 volume percent nitrogen.

18. The method of claim 12, wherein said displacement fluid is composed of more than about 50 volume percent light hydrocarbon, less than about 10 volume percent surfactant and less than about 40 volume percent cosolvent.

19. The method of claim 18, wherein said cosolvent is added in an amount less than about 5 volume percent and said surfactant is added in an amount of from about 0.2 to about 2.0 volume percent.

* * * * *

UNITED STATES PATENT AND TRADEMARK OFFICE
CERTIFICATE OF CORRECTION

PATENT NO. : 4,828,029
DATED : May 9, 1989
INVENTOR(S) : Cyrus A. Irani

It is certified that error appears in the above-identified patent and that said Letters Patent is hereby corrected as shown below:

In Column 2, Line 62, delete "Morris" and insert -- Morse --.

In Column 2, Line 67, delete "In".

In Column 9, Line 10, delete "wiht" and insert -- with --.

In Column 9, Line 11, delete "unusual" and insert -- usual --.

In Column 10, Line 65, after "polar" insert -- solvents to accommodate the highly polar --.

Signed and Sealed this

Twenty-seventh Day of February, 1990

Attest:

JEFFREY M. SAMUELS

*Attesting Officer*  *Acting Commissioner of Patents and Trademarks*